US 6,552,824 B2

(12) United States Patent
Rombola et al.

(10) Patent No.: US 6,552,824 B2
(45) Date of Patent: Apr. 22, 2003

(54) METHOD OF PROCESSING PIXELS WITH BINARY OR MULTIBIT ERROR DIFFUSION

(75) Inventors: Gregory Rombola, Spencerport, NY (US); Dongli Yang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/213,636

(22) Filed: Dec. 17, 1998

(65) Prior Publication Data

US 2002/0041397 A1 Apr. 11, 2002

(51) Int. Cl.$^7$ ................................................. G06F 15/00
(52) U.S. Cl. ....................................... 358/3.14; 382/252
(58) Field of Search ........................... 358/1.9, 534, 535, 358/536, 429, 456–460, 298, 3.13–3.15; 382/251–253, 237

(56) References Cited

U.S. PATENT DOCUMENTS

| 4,680,645 A |   | 7/1987 | Dispoto et al. ............ 358/298 |
| 5,087,981 A | * | 2/1992 | Ng et al. .................... 358/459 |
| 5,289,293 A | * | 2/1994 | Kato et al. .................. 358/457 |
| 5,689,588 A |   | 11/1997 | Rombola et al. .......... 382/237 |
| 5,748,785 A | * | 5/1998 | Mantell et al. ............ 382/237 |
| 5,751,929 A | * | 5/1998 | Ohnuma et al. ............ 358/1.9 |
| 6,041,139 A | * | 3/2000 | Okubo et al. ............... 382/199 |
| 6,201,612 B1 | * | 3/2001 | Matsushiro et al. ......... 358/1.9 |

FOREIGN PATENT DOCUMENTS

| EP | 0 202 425 A2 | 11/1986 |
| EP | 0 497 304 A2 | 8/1992 |
| GB | 2 148 660 A | 5/1985 |
| GB | 2 153 619 A | 8/1985 |
| GB | 2 166 921 A | 5/1986 |
| GB | 2 242 593 A | 2/1991 |
| JP | 06-233122 A | 8/1994 |
| JP | 10-271331 A | 10/1998 |
| JP | 11088665 | * 3/1999 |

* cited by examiner

Primary Examiner—Thomas D. Lee
Assistant Examiner—Stephen Brinich
(74) Attorney, Agent, or Firm—Norman Rushefsky (57) ABSTRACT

A method is described of processing image data of pixels to be rendered. In the method, image data representing a pixel to be rendered is provided. Criteria or tests are established for processing the pixel in accordance with binary error diffusion or multibit error diffusion. In response to examination of the pixel in accordance with the criteria, a decision is made as to whether the pixel is to be rendered in accordance with binary error diffusion or multibit error diffusion. The pixel is then rendered in accordance with the decision.

31 Claims, 4 Drawing Sheets

|   |   |   |   |
|---|---|---|---|
| G | H | I | J |
| F | B | C | D |
| E | A | P |   |

FIG. 5

|   |   |   |   |
|---|---|---|---|
| A | B | C | D |
|   | E | P |   |

|   |   |   |   |
|---|---|---|---|
| 1/8 | 2/8 | 2/8 | 1/8 |
|   | 2/8 | P |   |

P = CURRENT PIXEL
A,B,C,D,E = COMPUTED PIXEL ERROR AT EACH PIXEL LOCATION

FIG. 6

| THRESHOLD | OUTPUT | ESTIMATE VALUE |
|---|---|---|
| 255 | | 255 |
| | 0 | |
| 128 | | |
| | 3 | |
| 0 | | 0 |

EXAMPLE:
IF NEW PIXEL = 114
OUTPUT LEVEL = 3
ERROR = 114 − 0 = 114

FIG. 7

| THRESHOLD | OUTPUT | ESTIMATE VALUE |
|---|---|---|
| 255 | | 255 |
| | 0 | |
| 192 | | 160 |
| | 1 | |
| 128 | | 96 |
| | 2 | |
| 64 | | |
| | 3 | |
| 0 | | 0 |

EXAMPLE:
IF NEW PIXEL = 114
OUTPUT LEVEL = 2
ERROR = 114 − 96 = 18

FIG. 8

METHOD OF PROCESSING PIXELS WITH BINARY OR MULTIBIT ERROR DIFFUSION

FIELD OF THE INVENTION

The present invention relates to a method of processing of grey level image data for rendering in accordance with image type.

DESCRIPTION RELATIVE TO THE PRIOR ART

Original documents can be categorized into three different image types: 1) text and line art, 2) continuous tone, and 3) halftones. For optimal reproduction, each of these original types should be processed differently. Text and line art documents have little if any grey level information and hence require little or no preservation of grey scale information. Continuous tone and halftone originals, on the other hand require tone scale preservation to reproduce a large number of grey levels. In order to preserve the sharpness of text edges, a two dimensional FIR filter is applied to text and line art images. However, continuous tone and halftone images do not require as strong a filter. Halftone images typically require special processing to minimize moire patterns that can result from sample aliasing during the scan process.

Compound documents are documents which contain two or more of these image types within one page of an original. When such documents are scanned, image segmentation or image recognition technology is required to optimally process (in an automated manner without human intervention) each of the different image areas within a scanned image. Note that with human intervention, such an image can be optimally processed by designating areas of the image and how each area is to be processed. This method is not as productive as an image segmentation method.

Great strides have been made in image segmentation technology. Unfortunately, with as much progress as has been made, this technology is not always 100% accurate in its classifications. As a result, an alternative to image segmentation technology is to use a single processing method which although not optimal for each of the image types, results in image quality which is quite good. Such a method is referred to as a robust default rendering mode.

Binary error diffusion has proven to be a robust default mode. It's high frequency response allows for good preservation of text edges and pictorial details. It's ability to reproduce many levels of grey allows for good pictorial reproduction. The somewhat random nature of the dot creation provides for good rendition of halftone originals.

Grey scale writing systems provide the potential for significant enhancement of image quality for electrophotographic digital copier systems. Grey scale writing systems can utilize either a laser or LED exposure system. Different dot sizes or dot densities can be formed by modulating either the time or density of the exposure system.

Given a grey scale writing system, multibit error diffusion would seem to be a logical choice for default processing of compound documents. One would expect that grey pixels added along the edges of straight lines and curves of text could result in much smoother line edges. One would also expect that highlight regions of a pictorial would have a softer first step due to the ability to expose dots at a fraction of those exposed in a binary system. And one would also expect a significant improvement in the number of grey levels and tone scale reproduction of continuous tone and halftone originals. But due to the nature of the electrophotographic process, not all of these expectations are realized.

The inventors have noted that with multibit error diffusion, in general, and two bit error diffusion, in particular, certain dot patterns created by the multibit error diffusion algorithm result in poor image quality. This has been found to occur in the absence of a strong (fully exposed) dot. The result is that mid grey continuous tone regions are reproduced with a very course grainy structure. The same problem is exhibited with very high frequency halftone originals. The reason for this is the inherent inability of the electrophotographic process to expose and print continuous tone grey scale. Consider as an example a two bit writing system in which the possible exposure settings are 0, 1, 2, and 3 with 3 being most exposure and resulting in the largest or most dense dots. If a small region is exposed which contains all 1's, the result is a flat field region with a grainy appearance. This is a well recognized problem with electrophotographic systems. The reason is grey reproduction is best when there is structure in which dots are grown in clustered groups. However, the very nature of error diffusion is to disperse dot growth based on its mean preserving calculations.

In binary error diffusion, all pixel decisions result in a stable maximum exposure dot. With the exception of highlights, reproduction of mid grey continuous tone flat fields is not a problem. But binary error diffusion, even at resolutions of 600 dpi, creates text and line edges which are ragged in comparison to multibit error diffused text and line art. The quality of text and line reproduction can be improved by adding grey level along the edges. Reproduction of highlights is also a problem with binary error diffusion due to the fully exposed isolated dots.

SUMMARY OF THE INVENTION

The basis of the invention is to take advantage of the mean preserving nature of error diffusion.

In accordance with the invention, there is provided a method of processing image data of pixels to be rendered comprising providing image data representing a pixel to be rendered; establishing a criteria for processing the pixel in accordance with binary error diffusion or multibit error diffusion; and providing a decision as to whether the pixel is to be rendered in accordance with binary error diffusion or in accordance with multibit error diffusion; and rendering the pixel in accordance with the decision.

BRIEF DESCRIPTION OF THE DRAWINGS

In the detailed description of the preferred embodiments of the invention, reference is made to the accompanying drawings in which.

DESCRIPTION OF THE PREFERRED EMBODIMENTS

Because apparatus of the type described herein are in general well known, the present description will be directed in particular to elements forming part of or cooperating more directly with the present invention. Apparatus not specifically shown or described herein are selectable from those known in the prior art.

Figure 1:
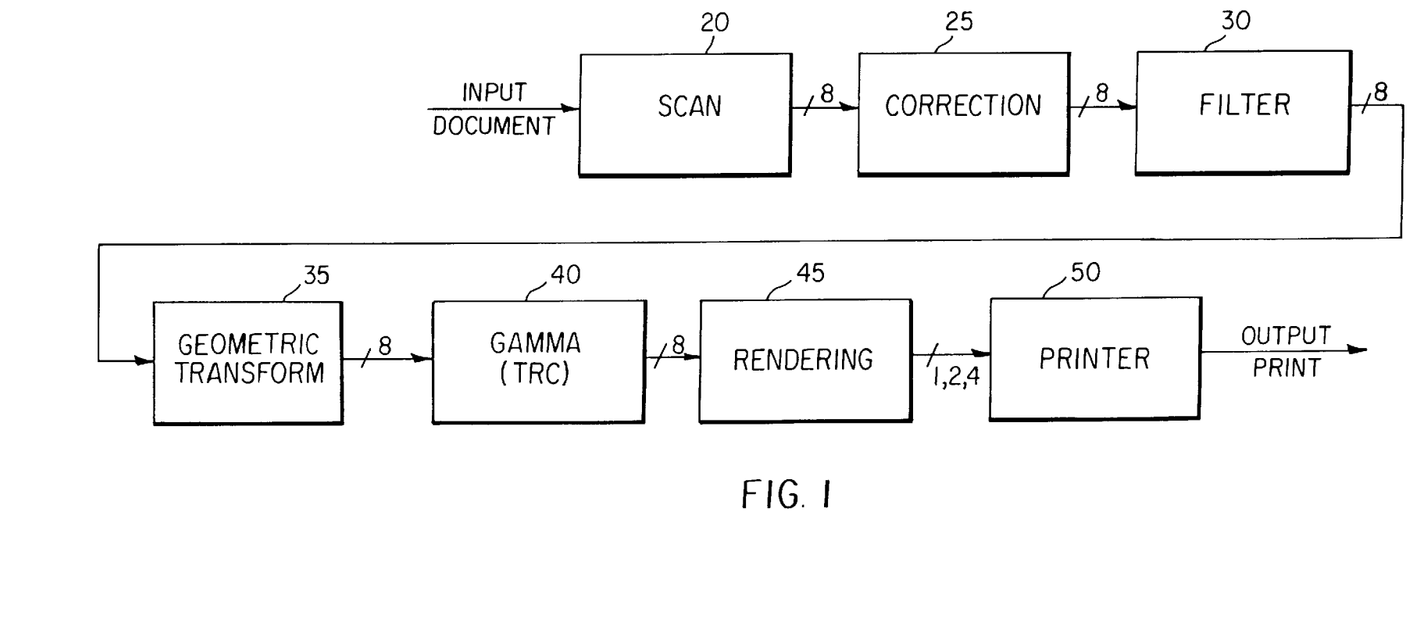
FIG. 1 is a block diagram of certain functional parts of a reproduction apparatus that operates in accordance with the method of the invention.

With reference now to FIG. 1, there is shown a schematic of a recording apparatus that includes a document scanner 20 which scans a document say at 600 dots per inch and outputs for each scanned pixel area an 8-bit signal representing grey level values from 0 to 255 of rasterized image data. Scanners of this type are well known and are provided with suitable electronic circuitry for correcting for background of the document and other factors not associated with the present invention.

Such correction is provided by suitable well known circuitry 25 and may include automatic gain correction, linearity correction, etc. After such correction, the image data may be subject to filtering, for example, by a FIR filter 30. Scaling of the image or rotation (generally denoted geometric transform) may also be provided for by circuitry 35 as is also well known. The scaling may be done to match the resolution of the output scanned image data with the printer or to otherwise magnify or demagnify the image. The image data, after geometric transform, maybe subject to gamma correction operation by circuitry 40 which tends to adjust the data for the tone reproduction curve (TRC) of the printer. The gamma correction operation may be by a look-up table (LUT). The above-described order of processing while preferred is not critical and the circuitry for same may be provided by circuits or computers suitably programmed. After the above corrections and modifications, the 8 bits per pixel image data is subject to a rendering operation 45 and this operation is what the invention is directed to. After rendering the output may be 1, 2 or 4 bits per pixel grey level information and sent to the printer 50 for printing the information on a receiver sheet such as paper or plastic. As noted above, the printer is preferably an electrophotographic printer having a raster output scanner (ROS) for recording image information on an electrostatically charged photoconductive image recording medium. The ROS may be a laser, LED printhead or other spatial light modulator display. After selective exposure of image pixels on the recording medium by the ROS in accordance with electronic image input signals input to the ROS the latent electrostatic image on the recording medium is developed with colored marking particles and then transferred to the receiver member as is well known.

Figure 8:
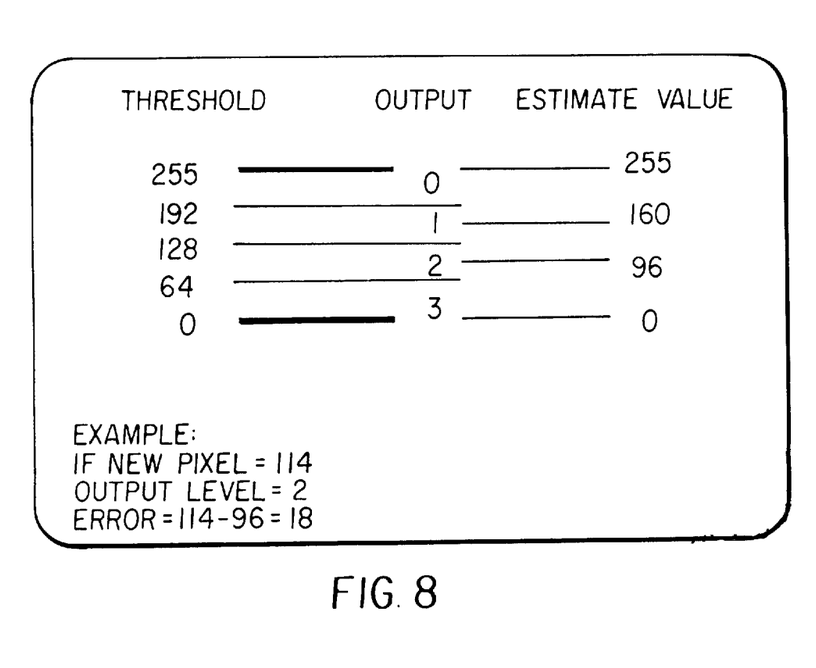

Since the scanner defines a pixel to be recorded with 8-bits of density data whereas the printer in this example records at say 4 levels of grey that can be defined with 2-bits of data there is a need to render the data; i.e., transform the scanner output data (after the indicated correction and adjustment prior to rendering) to a form suited for that of the printer. In the rendering process there is typically provided a thresholding operation. For example, and with reference to the table of FIG. 8, 8-bit density values of 0 to 63 may be rendered as pixel grey value 3. It being understood that raw grey level values from a scanner typically (but not necessarily) have darker pixels identified with lower pixel values. Scanned density values; i.e. values input to rendering block 45, of 64–127 maybe rendered as pixel grey value 2; etc. Since there is a range of scanned density values for which a rendered value may be assigned, it is convenient to assume that the midpoint of the range is the accurate rendition point and that quantization errors are defined from this midpoint range. Thus, a density value of 64–127 has a midpoint of 96. A density value of 114, when rendered as pixel grey value 2, has an assigned error of +18; i.e. (114–96). Similarly, for density values in the range 128 to 191 and rendered as pixel grey value 1, the quantization error represents the difference between the density value and the midpoint 160 with the appropriate sign. The use of the midpoint density is generally provided for except at the extremes; i.e., scanned density values 0–63 rendered as pixel value 3 are deemed to have error measured from 0; and density values 192 and rendered as grey level pixel values 0 are deemed to have error measured from 255. These values from which errors are calculated are listed in the table of FIG. 8 as the "estimated value".

Figure 6:
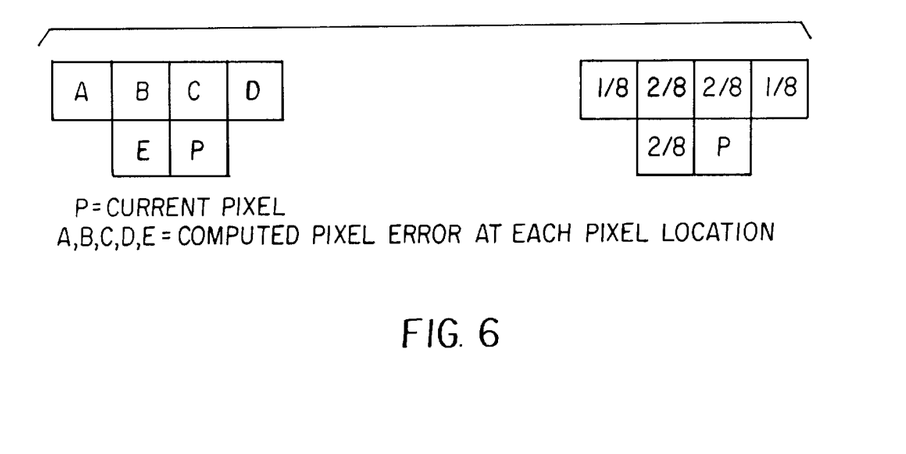
FIG. 6 is a kernel used in implementing error diffusion.

With reference to FIG. 6, error diffusion is performed by considering the current density value P and generating a modified density value by adding errors occurring in rendering of prior neighboring pixels A, B, C, D and E. Typically, these errors are weighted by multiplying each by a suitable coefficient so that errors in pixels closer to pixel P have more of an affect on adjustments to modify pixel P. The error diffusion kernel illustrated in FIG. 6 is merely exemplary and the invention is not limited to any particular error diffusion kernel or algorithm.

Figure 7:
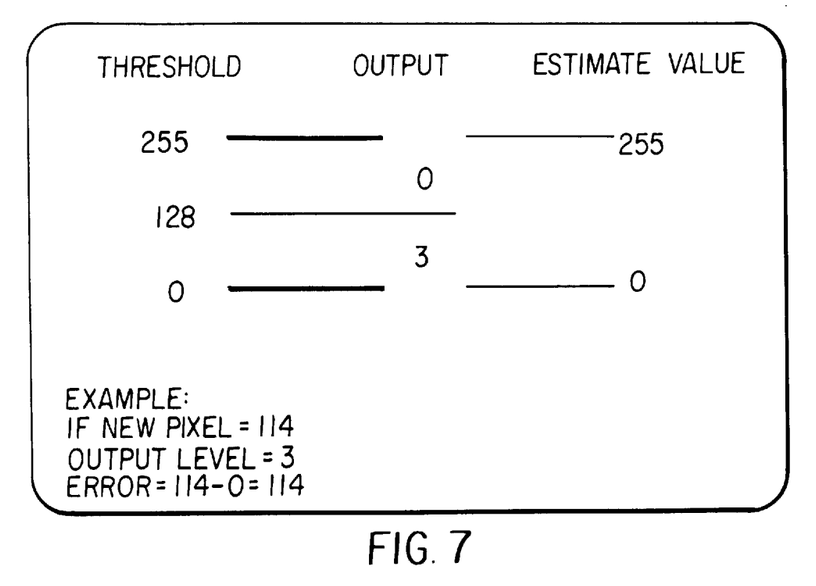
FIGS. 7 and 8 are charts illustrating respectively binary error diffusion and two-bit error diffusion.

Thus, element 45 shown in the schematic of FIG. 1 includes memory for storing errors of prior rendered pixels in the neighborhood (kernel) of the current pixel P and provides for multiplication of the errors in accordance with a suitable programmed coefficient. The sum of the weighted errors are then added in with the current density value as derived from the scanner after the noted various adjustments to define an 8-bit modified density value that is subject to thresholding by a grey level thresholder. The current density value is also used so that error may be determined in rendering of the current pixel for distribution to subsequent current pixels. In the exemplary description provided below multibit error diffusion will result in rendered pixel values being expressed in only 4 grey values in this case 0, 1, 2 and 3, respectively wherein 3 is the largest dot or densest dot or pixel. As this requires only 2-bits per pixel, the use of 8-bits per pixel downstream of rendering is optional and may be used if this is the nature of the hardware provided. It is particularly desirable to define rendered pixels in terms of 8-bits per pixel to provide for uniformity correction of the ROS device. In FIG. 7, there is illustrated a chart or table illustrating binary error diffusion. In considering an 8-bits per pixel input image data of 114, the output pixel level after rendering would be 3 in this case, as the threshold determining value is 128. The error in assigning a value of 3 is 114 and this error is diffused to the next pixel when the next pixel is rendered. The various elements may be realized by use of a general purpose computer or programmed microcomputer or a programmable logic circuit or dedicated circuit. Details regarding programming of such computer or microcomputers are well known and generally within the skill of the art. In addition, logic performing circuits and their construction are also well known.

It should be kept in mind that in performing error diffusion that in rendering a pixel using error diffusion that the previous pixels diffusion amounts as weighted are added (or subtracted) to the pixel value output by the gamma LUT before considering comparison with thresholding steps. Thus, a new pixel value is created for each pixel based on the scanned value of the pixel as modified in accordance with the processes noted above and as further modified by diffusion of errors from neighboring pixels.

In accordance with the invention, for each pixel, a decision is made to determine if the pixel should be rendered with binary or multibit error diffusion. This decision is based upon local image characteristics and the results of pixels already processed in the image neighborhood. An example of this is a preference to process text edges with two bit error diffusion (or generally multibit error diffusion) rather than binary error diffusion. After being rendered by either binary or two bit error diffusion, the resulting pixel value can be forced to a different value depending upon image characteristics of the local image area, output pixel decisions already made in the local area and the result of the currently processed pixel. Once the final pixel result is computed or forced, the correct pixel error is computed based on the updated pixel result.

The objective of this method is to apply the algorithm which yields the best results for the given image characteristic or region being processed. Binary error diffusion is applied to pixels in image regions with characteristics for which binary error diffusion produces better results than multibit error diffusion and in cases where a strong dot is required as the anchor for a cluster of grey level dots. Two bit error diffusion is applied to pixels in image regions with characteristics for which two bit error diffusion produces better results such as text edges and highlight regions. Once processed by binary error diffusion or two bit error diffusion, a pixel result can still be changed in order to avoid conditions which result in poor image quality.

Note, the examples provided herein are of two bit error diffusion. However, this invention is not limited to two bit error diffusion and can be extended to any multibit error diffusion method (e.g. four bit error diffusion).

A more detailed description of the parameters used to define the image characteristics follows.

Local Image Region Size

The size or area of the local image region is not limited to any specific size according to this invention other than the size is an N×M pixel window or area where N can be equal to M. For purposes of examples, let us assume the size of the local region is a 3×3 pixel area. The window is preferably rectangular but need not be.

Image Characteristics

Two local image characteristics are of interest. One is to determine if the pixel being processed is in a flat field continuous tone region or if it is in a text or low frequency halftone region. A local image statistic which can provide this information is called local contrast. "Local contrast" is preferred to be determined as: maximum pixel value in a window region minus minimum pixel value in the window region. There are other local image statistical methods to derive the same information, and this invention is not limited to a particular local contrast determining algorithm.

Another local image region characteristic is if the pixel being processed is in a dark, mid grey or highlight region. A local image statistic which can provide this information is local mean. "Local mean" is preferred to be determined by: (sum of pixel values in the window region divided by number of pixels in the window region). One way to obtain local mean using a 3×3 pixel area is to use 8 of the 9 pixels in the 3×3 window. Thus, for this example a window of 8-pixels is considered. The center pixel value being processed is ignored. This method allows for simpler hardware implementation due to divide by eight rather than divide by nine. There are other methods to determine this characteristic, and this invention is not limited to the local mean method just described. In using pixel values to determine local contrast and local mean, the pixel values used are those values output by the gamma correction LUT and prior to adjustment by diffusion of errors thereto.

Previous Pixel Results

Figure 5:
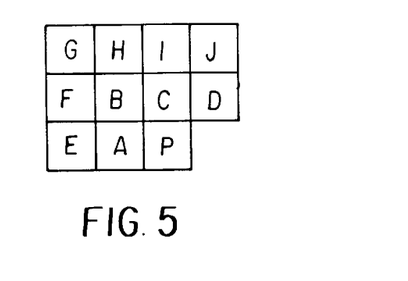
FIG. 5 is a window of neighboring pixel locations used in examining a pixel for rendering.

Results of previously processed pixels are used to determine if a condition may exist which requires a pixel result to be "forced" to a value other than what the algorithm has computed. The region over which this occurs is not limited to any specific size. Previous pixel results are used to determine if a condition exists which may result in poor reproduction due to the electrophotographic limitations. Two such conditions exist:

For mid grey regions, if the conditions for a strong clustered dot do not exist in the immediate region of the pixel being processed, then it is processed as binary error diffusion. This averts the condition which leads to grainy flat field regions. Examples of such rules follow:

With respect to the window of pixels illustrated in FIG. 5, P is the current pixel being processed. The writing system supports a two bit per pixel exposure. For two bit error diffusion, pixel values of 0, 1, 2, and 3 are possible with three being maximum exposure (biggest or most dense dot formed). For binary error diffusion, the pixel result is either 0 or 3. Of course, in some systems 0 might be maximum exposure and 3 the minimum exposure or no exposure. The development processes may also differ with some development processes developing exposed areas and other development systems developing unexposed areas. However, in the example described here, 3 is the biggest or most dense dot formed.

Mid-Grey Rule

Rule examples (note these are alternatives and others may exist):

EXAMPLE 1

If A or B or C or D=3
  process pixel P using two bit error diffusion else
  process pixel P using binary error diffusion

EXAMPLE 2

If A or C=3
  process pixel P using two bit error diffusion else
  process pixel P using binary error diffusion

EXAMPLE 3

If (A or B or C or D=3) or (E and A=2) or (I and C=2)
  process pixel P using two bit error diffusion else
  process pixel P using binary error diffusion Highlight Rule Rules for highlight regions differ from rules for mid grey regions. In highlight regions, maximum exposed dots are to be avoided in order to prevent strong isolated dots from occurring. Therefore, if the result of binary or multibit error diffusion results in a maximum (level 3) exposed dot, it is forced down to a level 2. A level 1 resulting from two bit error diffusion is permitted in regions which satisfy the highlight rule. That is regions which will support a level 1 by the presence of a surrounding cluster of level 2s. Examples follow (these are alternatives and others may exist):

EXAMPLE 1

If (A and B=0) and (C and D=2)
   process pixel P using two bit error diffusion
   if result of two bit error diffusion=3
      force result to 2 else
   process pixel P using binary error diffusion
   if result of binary error diffusion=3
      force result to 2

EXAMPLE 2

If (A and B=2)or (B and C=2) or (C and D=2)
   process pixel P using two bit error diffusion
   if result of two bit error diffusion=3
      force result to 2 else
   process pixel P using binary error diffusion
   if result of binary error diffusion=3
      force result to 2

Note that the pixel result rules represent algorithm adjustments to accommodate the behavior of the electrophotographic process. As such, this invention is not limited to the set of rules defined in the examples but rather encompasses the concept of using such rules in tandem with the mean preserving nature of error diffusion to accommodate the vagaries of the electrophotographic process to yield improved image quality with multibit error diffusion.

Error Diffusion

With reference again to FIG. 6, there is shown a preferred kernel or window of neighboring pixels used to calculate the new input pixel value that is to be rendered. A, B, C, D and E are pixel locations of pixels which have been previously rendered according to the algorithm to be described and whose errors in rendering are diffused to pixel P, which is the pixel currently under consideration for rendering. The respective weight values associated with locations A, B, C, D and E are shown to the right in FIG. 6.

With this kernel, a "new pixel value" is computed using the equation:

$$\text{new pixel} = \text{gamma corrected current pixel} + 1/8*A + 2/8*B + 2/8*C + 1/8*D + 2/8*E$$

The rendered pixel result is determined by comparing the new pixel value to the threshold value. A diagram illustrating the threshold values for binary and two bit error diffusion is provided in FIGS. 7 and 8. The number of threshold values for 1 and two bit error diffusion are 1 and 3, respectively. In the diagram, the photometric interpretation of the pixel values is white=255 and black=0. For the rendered results, white (or no exposure in a "write black" system is 0 and maximum dot density is 3. This invention is not limited to the specific photometric interpretation of the 8 bit pixel values or the rendered pixel results.

The following generic pseudo code demonstrates the method by which an output pixel result is determined once the new pixel value has been calculated.

For i=0 to i<Number of output levels
   If new pixel<threshold value(i)
      Output Level=Level(i)
      Error=New Pixel−Estimate Value(i)

Examples of the output level decision is provided in the illustrations described above. It will be understood that for the examples described herein that when binary error diffusion is invoked, the output pixel decision can be either 0 or 3. But when two bit error diffusion is invoked, the output pixel decision can be 0, 1, 2, or 3. Also note that when the output level decision is "forced" or changed the corresponding error for the current pixel is computed based on the estimate for the forced result.

Figure 2:
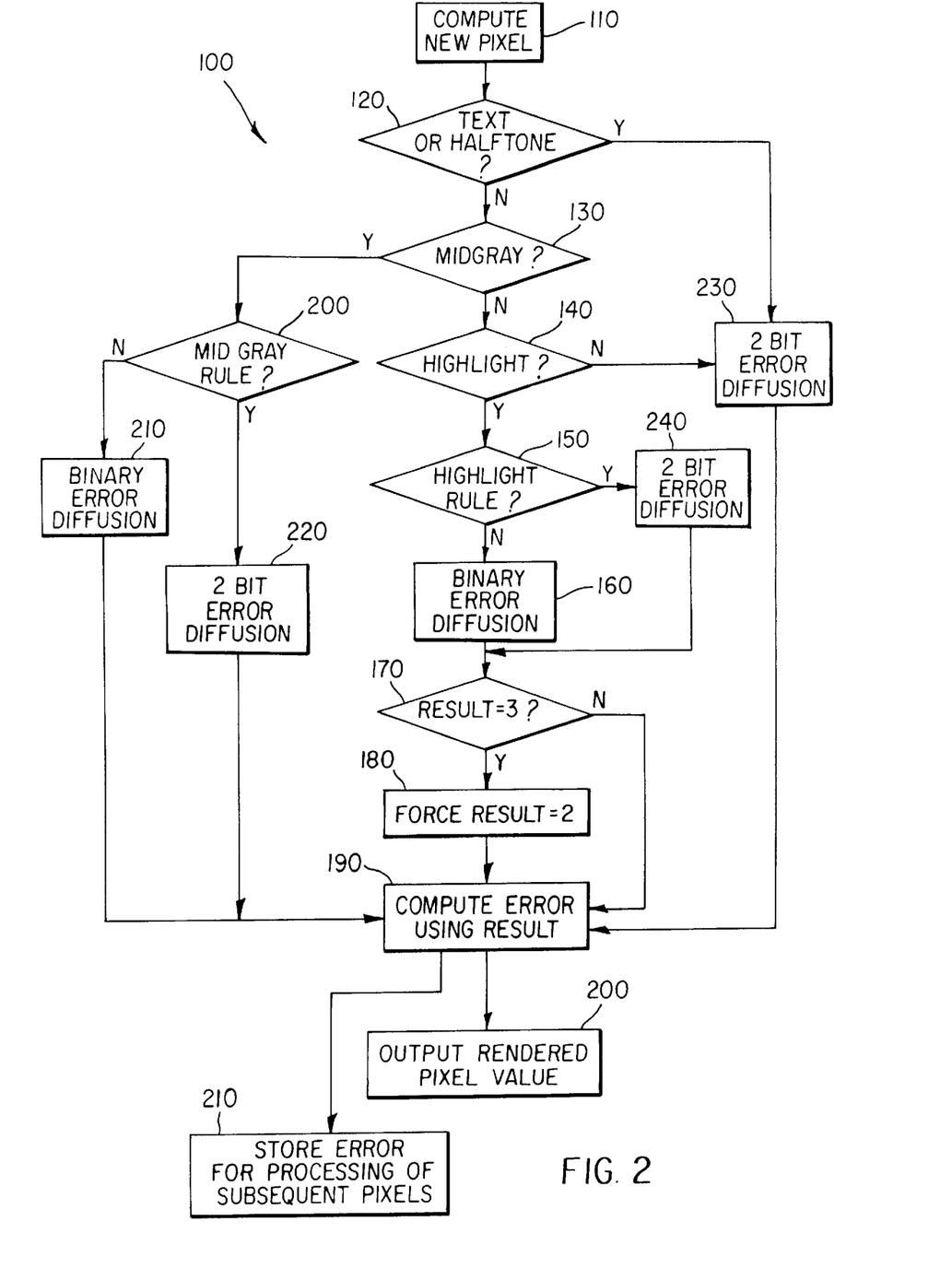
FIG. 2 is a flowchart illustrating processing of pixels for rendering in accordance with the method of the invention.
Figure 3:
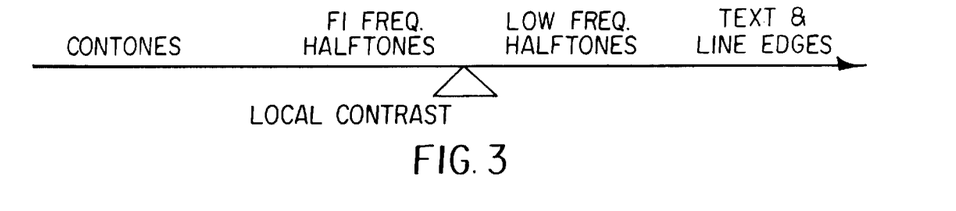
FIG. 3 is a chart illustrating a test to examine a pixel for local contrast.

Reference will now be made to the flowchart of FIG. 2 which illustrates a preferred algorithm 100 for rendering pixels in accordance with the invention. It being understood that the corrected pixel value from the scanner; i.e., the output after gamma correction block 40, is now adjusted by diffusion of errors from the neighboring pixels and will be referred to as the new adjusted pixel value (NAPV) for pixel P.

In step 120 a first criterion for consideration is whether or not pixel P is text or low frequency halftone. Low frequency halftone is considered to be about 120 lines per inch or less. A test for text or low frequency halftone involves examination of local contrast which is defined above. A decision that local contrast is present (YES) implies that the region including pixel P is to be processed as text using two bit (or multibit) error diffusion, step 230. If the local contrast is determined not to be present (NO) the pixel is processed as being in a continuous tone (or high frequency halftone) region.

Figure 4:
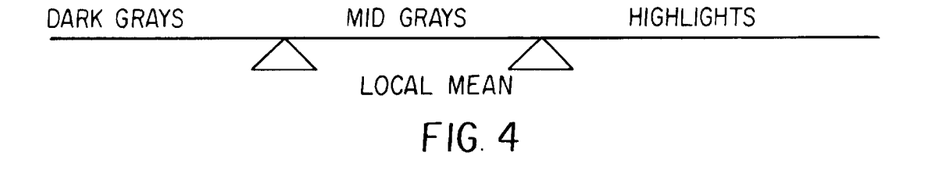
FIG. 4 is a chart illustrating a test to examine a pixel for local mean.

When pixel P is determined to be in a continuous tone region examination is next made as to whether or not pixel P is in a mid-grey region (step 130). In the decision process, the region is determined to be mid-grey by examining for example local mean which is also defined above. In FIG. 4, the points of local mean distinguishing dark greys, mid greys and highlight region may be determined heuristically.

If the pixel P is determined to be in the mid-grey region of a continuous tone region, pixel P is then examined for conditions of a strong clustered dot using the referred to mid-grey rule (step 200). Several examples are given above which can be used as the criterion for this examination. If the examination's answer is yes, i.e., conditions for a strong clustered dot exist the pixel P is processed according to two-bit (or multibit) error diffusion, step 220. If the answer is no, the pixel P is processed according to binary error diffusion, step 210.

If in step 130, pixel P is determined not to be in the mid-grey region, then pixel P is next examined to determine if it is in the highlight region, step 140. As noted above, this determination is made by examining local mean. If pixel P is determined not to be in the highlight region, it is processed using two-bit error diffusion step 230. If pixel P is determined to be in the highlight region it is then examined under the highlight rule set forth above, step 150. If from the highlight rule the indication is that the pixel has sufficiently strong neighbors (i.e. level 2) to form a clustered dot with a level 1, then pixel P is rendered using two-bit error diffusion (step 240). If, under the examination of the criteria for the highlight rule, pixel P is determined to result in a grainy texture due to the absence of strong neighbors. The pixel P is rendered using binary error diffusion step 160.

In step 170 the results of the rendering by either binary or two-bits error diffusion are examined to see if the result is a 3 or maximum density pixel. Since in highlight regions maximum density or size dots are preferably avoided the rendered result of error diffusion that provides a result of 3 is adjusted or forced to a rendered density level 2 (step 180).

The advantage of rendering pixel P in the highlight regions with two bit error diffusion is the ability to exploit the first grey level (level 1) which can attach itself to a cluster of level 2 pixels. This provides the ability to produce a non-grainy lighter density than would other wise be possible with either binary diffusion alone or two bit error diffusion alone.

After the rendered value of a pixel is determined the value is used to compute the quantization error by the rendering process, step 190. This computed error is stored and used for diffusion in rendering of subsequent pixels as described above. The apparatus includes memory sufficient to store the various pixel values required for processing the current pixel such as incoming pixel values of neighboring previously processed pixels and errors associated with such processing The rendered pixel value is then output to the printer or to a printer interface. The rendered pixels may be stored or compressed and then stored and sent to the printhead. For some printheads, the rendered value may be corrected for non-uniformity correction such as is typically provided in LED printheads. The rendered image data or corrected rendered image may then be used for exposing at various different exposure levels according to the corrected rendered density values, an electrostatically charged photoconductive web or drum or other photosensitive element that is operated on or is a part of a marking engine. Alternatively, the rendered image data may be printed using an electrographic recorder which records pixels of different density by depositing charge of different levels on an insulative surface. The electrostatic image may then be developed by electroscopic colored toner particles and transferred to a recording sheet.

The invention has been described in detail with particular reference to preferred embodiments thereof, but it will be understood that variations and modifications can be effected within the spirit and scope of the invention.

What is claimed is:

1. A method of processing image data of pixels to be rendered comprising:

providing image data representing a pixel to be rendered;

establishing criteria for processing the pixel in accordance with binary error diffusion or multibit error diffusion, providing a decision as to whether the pixel is to be rendered in accordance with binary error diffusion or in accordance with multibit error diffusion, wherein the image data representing a pixel to be rendered is adjusted in pixel value in accordance with rendering errors determined prior neighboring rendered pixels;

rendering the pixel in accordance with the,decision; and wherein the adjusted pixel value is examined for local contrast and if local contrast is found, the pixel is rendered in accordance with multibit error diffusion.

2. The method of claim 1 wherein the adjusted pixel value is examined for local mean to determined if the adjusted pixel is in a dark, mid-grey or highlighted region.

3. The method of claim 2 wherein if the pixel is determined to be in a mid-grey region and is further determined to be in an immediate region where a strong clustered dot exists the pixel is rendered in accordance with multibit error diffusion.

4. The method of claim 3 wherein if the pixel is determined to be in a mid-grey region and is further determined to be not in an immediate region where a strong clustered dot exists the pixel is rendered in accordance with binary error diffusion.

5. The method of claim 2 wherein if the pixel is determined to be in a mid-grey region and is further determined to be not in an immediate region where a strong clustered dot exists, the pixel is rendered in accordance with binary error diffusion.

6. The method of claim 2, wherein local mean is determined by the sum of pixel values in a window region divided by the number of pixels in the window region.

7. The method of claim 1 wherein local contrast is found when a maximum pixel value and a minimum pixel value are found in a window region.

8. The method of claim 1 wherein if the pixel is in a highlight region, the pixel is processed according to either binary or multibit error diffusion and if a maximum density pixel value results from a preliminary processing decision the maximum density pixel value is then changed to a less than maximum density pixel value in rendering of the pixel.

9. The method of claim 1 wherein in rendering the pixel in accordance with a decision for rendering with binary error diffusion, errors in rendering of prior neighboring pixels are used to generate a modified density value for a current pixel under consideration for rendering by comparison with only one threshold value and wherein in rendering the pixel in accordance with a decision for rendering with multibit error diffusions, errors in rendering of prior neighboring pixels are used to generate a modified density value for a current pixel under consideration for rendering by comparison with plural threshold values.

10. The method of claim 1 and wherein at least some pixels that are rendered using binary error diffusion and other pixels that are rendered using multibit error diffusion are all printed in the same color.

11. The method of claim 1 and including the step of printing the pixels after the processing of the image data so that the image is formed of pixels printed in the same color in each of four different sizes or densities including background.

12. A method of processing image data of pixels to be rendered comprising:

13. The method of claim 12 wherein if the pixel is in a highlighted region, the pixel is processed according to either binary or mulitibit error diffusion.

14. The method according to claim 13 wherein if the pixel is in a highlight region, the pixel is processed according to an error diffusion processing algorithm and if a maximum density pixel value results from the error diffusion processing algorithm the maximum density pixel value is then changed to a less than maximum density pixel value in rendering of the pixel.

15. The method of claim 12 wherein the image data representing a pixel to be rendered is adjusted in pixel value in accordance with rendering errors determined for prior neighboring rendered pixels.

16. The method of claim 15 wherein the adjusted pixel value is examined for local contrast and if local contrast is found, the pixel is rendered in accordance with multibit error diffusion.

17. The method of claim 12 wherein in rendering the pixel in accordance with a decision for rendering with binary error diffusion, errors in rendering of prior neighboring pixels are used to generate a modified density value for a current pixel under consideration for rendering by comparison with only one threshold value and wherein in rendering the pixel in accordance with a decision for rendering with multibit error diffusion, errors in rendering of prior neighboring pixels are used to generate a modified density value for a current pixel under consideration for rendering by comparison with plural threshold values.

18. The method of claim 17 and wherein at least some pixels that are rendered using binary error diffusion and other pixels that are rendered using multibit error diffusion are all printed in the same color.

19. The method of claim 12 and wherein at least some pixels that are rendered using binary error diffusion and other pixels that are rendered using multibit error diffusion are all printed in the some color.

20. The method of claim 12 and including the step of printing the pixels after the processing of the image data so that the image is formed of pixels printed in the same color in each of four different sizes or densities including background.

21. A method of processing image data of pixels to be rendered comprising:

providing image data representing a pixel to be rendered;

establishing criteria for processing the pixel in accordance with binary error diffusion or multibit error diffusion;

providing a decision as to whether the pixel is to be rendered in accordance with binary error diffusion or in accordance with multibit error diffusion;

rendering the pixel in accordance with the decision;

wherein the pixel is printed in an electrophotographic recording apparatus; and providing binary error diffusion where a strong dot is required as the anchor for a cluster of gray level dots.

22. The method of claim 21 wherein in rendering the pixel in accordance with a decision for rendering with binary error diffusion, errors in rendering of prior neighboring pixels are used to generate a modified density value for a current pixel under consideration for rendering by comparison with only one threshold value and wherein in rendering the pixel in accordance with a decision for rendering with multibit error diffusion, errors in rendering of prior neighboring pixels are used to generate a modified density value for a current pixel under consideration for rendering by comparison with plural threshold values.

23. The method of claim 21 and wherein at least some pixels that are rendered using binary error diffusion and other pixels that are rendered using multibit nor diffusion are all printed in the same color.

24. The method of claim 21 and including the step of printing the pixels after the processing of the image data so that the image is formed of pixels printed in the same color in each of four different sizes or densities including background.

25. A method of processing image data of pixels to be printed in a single color comprising:

providing image data representing the pixels to be printed in the single color;

establishing criteria for processing the pixels to be printed in the single color in accordance with binary error diffusion or multibit error diffusion;

providing a decision as to whether one pixel of the pixels is to be rendered in accordance with binary error diffusion or in accordance with multibit error diffusion;

rendering the one pixel using binary error diffusion in accordance with a decision to render the one pixel in accordance with binary error diffusion;

providing a decision as to whether a second pixel of the pixels is to be rendered in accordance with binary error diffusion or in accordance with multibit error diffusion;

rendering the second pixel using multibit error diffusion in accordance with a decision to render the second pixel in accordance with multibit error diffusion; and printing the one pixel and the second pixel in the single color wherein the printing of pixels after the processing of the image data is such that the image is formed of pixels printed in each of four different sizes or densities including background.

26. The method of claim 25 wherein in rendering a pixel in accordance with a decision for rendering with binary error diffusion, errors in rendering of prior neighboring pixels are used to generate a modified density value for a current pixel under consideration for rendering by comparison with only one threshold value and wherein in rendering a pixel in accordance with a decision for rendering with multibit error diffusion, errors in rendering of prior neighboring pixels are used to generate a modified density value for a current pixel under consideration for rendering by comparison with plural threshold values.

27. The method of claim 26 wherein the image data representing a pixel to be rendered is adjusted in pixel value in accordance with rendering errors determined for prior neighboring rendered pixels.

28. The method of claim 27 wherein the adjusted pixel value is examined for local and if local contrast is found for a pixel, that pixel is rendered in accordance with multibit error diffusion.

29. The method of claim 28 wherein the adjusted pixel value is examined for local determine if the pixel is in a dark, mid-grey or highlighted region.

30. The method of claim 29 wherein if the pixel is determined to be in mid-grey region and is further determined to be in an immediate region where a strong clustered dot exists the pixel is rendered in accordance with multibit error diffusion.

31. The method of claim 25 wherein if the pixel is text it is rendered in accordance with multibit error diffuision.

* * * * *